United States Patent [19]

Yang

[11] 4,350,232

[45] Sep. 21, 1982

[54] MECHANICAL SHOCK ARRESTOR

[75] Inventor: Elmer C. Yang, Orange, Calif.

[73] Assignee: Pacific Scientific Company, Anaheim, Calif.

[21] Appl. No.: 776,397

[22] Filed: Mar. 10, 1977

[51] Int. Cl.³ .............................................. F16F 7/10
[52] U.S. Cl. ..................................... 188/378; 248/562
[58] Field of Search ............... 188/134, 180, 378–380, 188/382; 248/562, 566, 569, 570, 573, 584

[56] References Cited

U.S. PATENT DOCUMENTS

| Re. 29,221 | 5/1977 | Yang | 188/378 |
| 2,847,869 | 8/1958 | Hogan et al. | 188/134 |
| 3,756,351 | 9/1973 | Sasaki | 188/378 |

Primary Examiner—Duane A. Reger
Attorney, Agent, or Firm—Knobbe, Martens, Olson, Hubbard & Bear

[57] ABSTRACT

Relative axial motion of a pair of strut members is converted into rotation of a shaft which drives a rotatably mounted inertia element. Rotation of the shaft in the opposite direction drives a second rotatably mounted inertia element. The inertia elements are interconnected by a coil spring with the result that the inertia element driven directly by the shaft drives the other inertia element. At a predetermined acceleration, the inertia element driven by the spring will lag, and this lagging motion is used to actuate a braking action to limit the acceleration.

23 Claims, 10 Drawing Figures

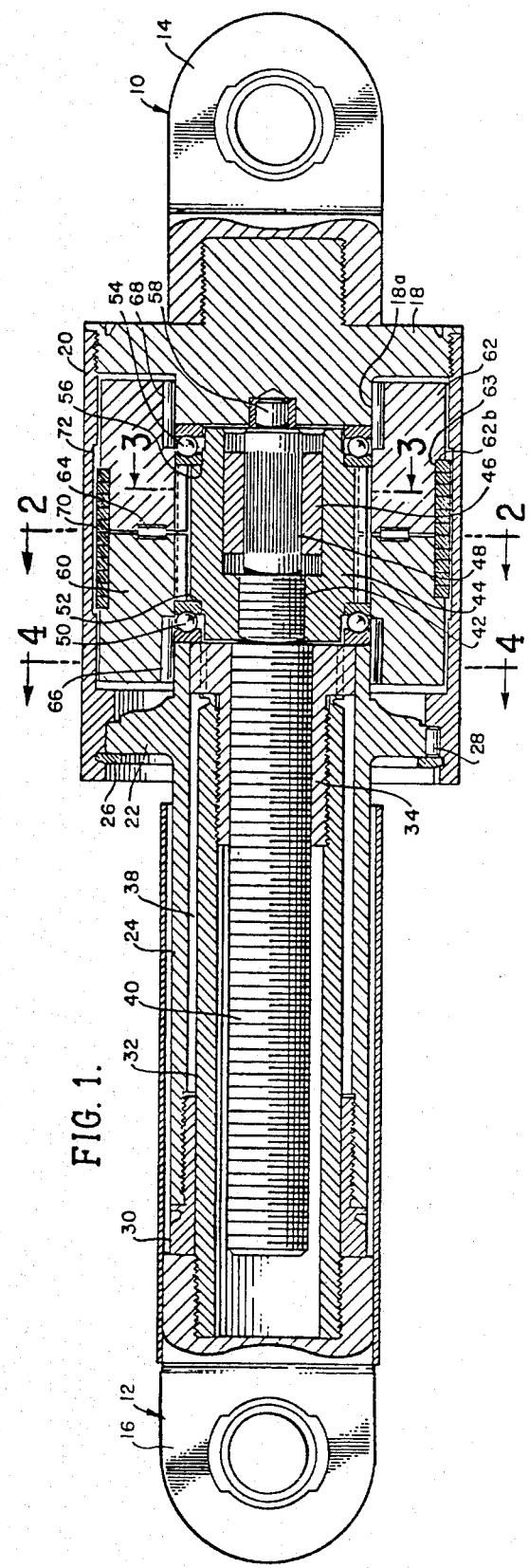
FIG. 1.
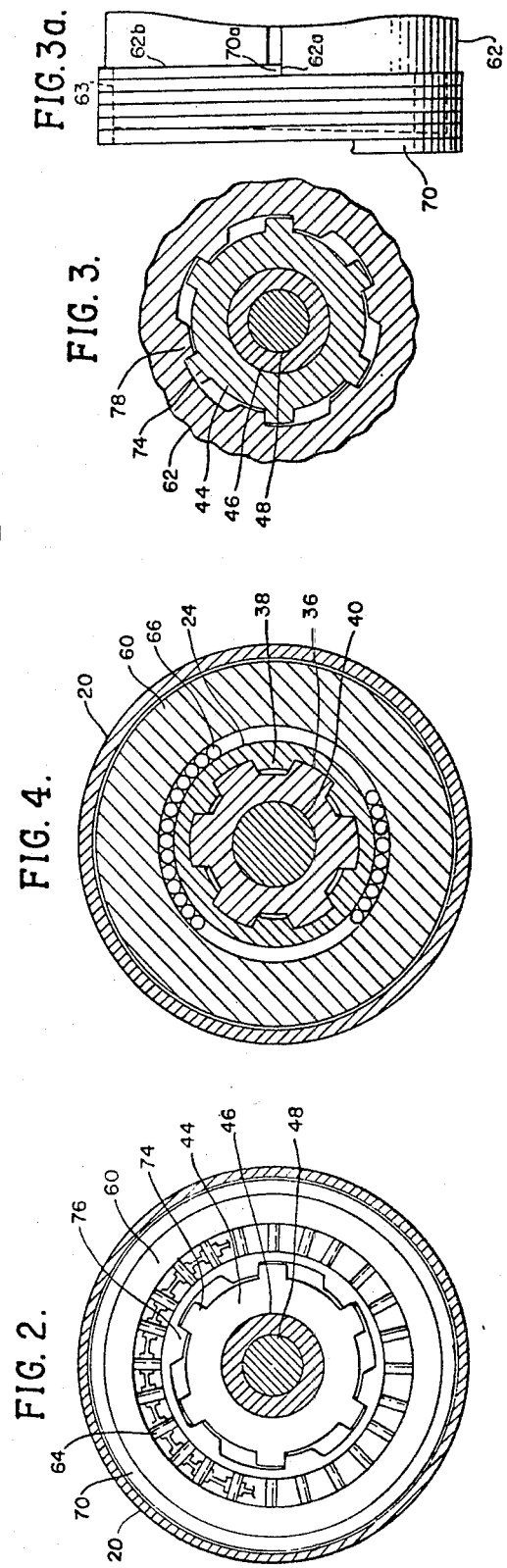
FIG. 3a.
FIG. 3.
FIG. 4.
FIG. 2.

MECHANICAL SHOCK ARRESTOR

This invention relates to apparatus for limiting acceleration of two relatively moving members to a predetermined threshold, and more particularly, to an improved all mechanical shock arrestor or motion snubbing device.

In U.S. Pat. No. 3,876,040, there is disclosed an acceleration sensitive motion snubber that is particularly useful in snubbing motion which occurs from earthquakes or other rapidly accelerating forces. Such devices permit slow acceleration such as that which occurs due to temperature changes but will prevent rapid acceleration while still permitting continued movement at the lower acceleration levels. The device shown in U.S. Pat. No. 3,876,040 is particularly useful in connection with atomic energy electric generating plants because it is highly reliable and is not affected by radiation, as are hydraulic snubbers.

The present invention relates to improvements in an acceleration sensitive mechanical shock arrestor of the general type disclosed in the above-mentioned patent. Such shock arrestor has been very successful, particularly in the smaller sizes. However, with struts for handling exceedingly large loads such as that which might be imposed on struts attached directly to major components within a nuclear reactor, the design shown in the above-mentioned patent can become larger than desired when having adequate strength. Thus, the present invention employs arrangements which are more compact and also highly reliable.

In accordance with the invention, a pair of members mounted for relative movement are connected to a pair of inertia elements which are mounted to be freely rotated. The connecting means between the members and the inertia elements is so arranged that relative movement of the members in one direction will only directly or positively drive one of the inertia elements and relative movement of the member in an opposite direction will only directly or positively drive the other inertia element. These inertia elements are in turn connected in a manner such that the element being rotated by the drive means will rotate the other inertia element. This second inertia element will sense the acceleration and will follow the first one below a predetermined motion threshold; but if acceleration is attempted beyond that threshold, this second inertia element will initiate a braking action to limit motion to said threshold.

In a preferred form of the invention, the inertia elements are cylindrical or somewhat disc shaped and are mounted coaxially with two of their ends in face to face relation. Motion is transmitted between the inertia elements by means of a coil spring which surrounds the interfacing portions of the elements. If the force applied to the inertia elements exceeds a predetermined acceleration threshold, the inertia of the elements being driven by the coil spring will cause the element to impose a lagging force on the springs which in turn will cause it to increase its diameter so that it will brake against a surrounding housing wall. This braking action prevents acceleration beyond the threshold.

In one form of the invention, the axial length of a strut employing the acceleration sensitive means has been cleverly minimized. A very short strut is needed in certain applications such as interconnecting fuel rod support tubes in a nuclear reactor.

In such an axially short snubbing device, the inertia elements are made axially short so that they are somewhat disc shaped. The drive shaft for rotating the inertia elements is formed with high lead threads on opposite ends which cooperate with members to be attached to the fuel rod tubes or other structure whose motion is to be arrested. These connecting members are slidably mounted for axial movement in the ends of a housing containing the inertia elements and the slidable mounting arrangement prevents rotation of the connecting members. The threaded connections between the members and the shaft are such that moving the connecting members towards each other will produce rotation of the shaft in one direction and moving the connecting members away from each other will rotate the shaft in the opposite direction. This is preferably accomplished by having the threads on opposite ends of the shaft extend in opposite directions. Thus, both connecting members and both ends of the shaft are involved in converting axial movement of the device into rotation of the inertia elements.

For a more thorough understanding of the invention refer now to the following detail description and drawings in which:

FIG. 1 is a cross-sectional view on the longitudinal axis of a strut embodying one form of the invention;

FIG. 2 is a cross-sectional view on line 2—2 of FIG. 1;

FIG. 3 is a cross-sectional view on line 3—3 of FIG. 1;

FIG. 3a is a side elevational view illustrating the connection between an inertia element and the spring;

FIG. 4 is a cross-sectional view on line 4—4 of FIG. 1;

Figure 6:
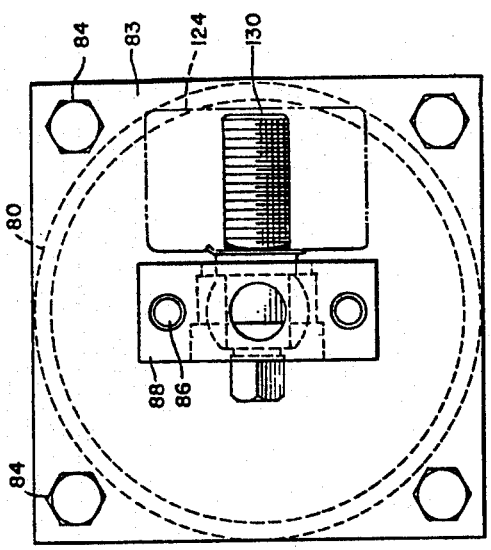
FIG. 6 is a view of the strut of FIG. 5 on line 6—6.

Referring now to FIG. 1, the shock arrestor shown includes a pair of support or connecting members generally indicated at 10 and 12 which are telescopically mounted on each other for relative axial reciprocation. These support members are formed of several different components which are rigidly connected to move as a unit. Thus, the support members 10 and 12 each include an end tongue 14 and 16, respectively, which are adapted to be connected to the structures whose relative motion is being arrested. The tongue 14 is threadably attached to a heavy disc shaped end plate which in turn is attached to a tubular or cylindrical housing 20.

Attached to the other end of the housing 20 is an end plate or flange 22 formed integral with a tube 24. The flange 22 is positioned against an annular shoulder in the housing wall 20 and is axially held in this position by a retaining ring 26. The flange 22 is also rotationally fixed with respect to the housing wall 20 by means of a series of pins 28, one of which is shown in FIG. 1.

The other end of the tube 24 is threaded to a tubular sleeve 30 which slidably receives an elongated support tube 32, which is threadably attached to the tongue 16 of the support member 12. Threadably attached to the interior of the other end of the tube 32 is a tubular nut 34 which has an outwardly extending flange on one end that has a plurality of radially extending lugs 36, as seen in FIG. 4. These lugs fit within axially extending grooves formed between splines 38 on the interior of the tube 24 which is attached to the support assembly 10. Thus, it can be seen that the telescopic movement of the assemblies 10 and 12 occurs by the tube 32 axially sliding within the tube 24 and its sleeve 30. The cooperation between the nut lugs 36 and the splined interior 38 of the tube 24 prevents rotation of the assemblies 10 and 12. The strut is shown in its fully telescoped position with the end of the sleeve 30 engaging the interior end wall of the tongue 16.

The interior of the tubular nut 34 is formed with a high-lead thread which mates with a high-lead thread formed on the exterior of the shaft 40 which extends within the tube 32 and into the housing 20. The portion of the shaft extending into the housing 20 has a section 42 with a slightly reduced diameter on which is threadably mounted a tubular load transfer member 44. The member 44 is rotationally and axially locked on the shaft by means of a plug sleeve 46 which is forced between an axially ridged bore in the member 44 and an axially ridged section 48 formed on the shaft 40.

As seen from FIG. 1, the shaft through its load transfer member 44 is rotatably mounted within the housing 20 on the support assembly 10. This is accomplished by means of a schematically illustrated bearing 50 which extends between the inner end of the tube 24 and an annular shoulder 52 formed on one end of the load transfer member 44. Similarly, a bearing 54 is positioned between the interface of the end plate 18 and an annular shoulder 56 formed on the other end of the load transfer member 44. The tip 58 of the shaft 40 is also rotatably mounted in the end plate 18; however, the axial load on the strut is carried on the bearings 50 and 54.

Between the housing wall 20 and the load transfer member 44, there is formed an annular cavity in which is positioned a pair of ring shaped or annularly shaped inertia elements 60 and 62. As may be seen from FIG. 1, these members are identical and they are axially aligned within the cavity. However, they are mounted in opposed relation with the end face of one closely positioned adjacent the similar end face of the other. A suitable roller bearing unit 64 is positioned in recesses formed in the opposing end faces to facilitate the rotation of the inertia elements with respect to the other. The inertia element 60 is further rotatably mounted by a roller bearing 66 positioned between the inner wall of the element 60 adjacent its axially outer end and the exterior of the tube 24 adjacent its end within the housing 20. Similarly, a bearing 68 is positioned between the inner wall of the inertia element 62 adjacent its axially outer end and the exterior of a cylindrical axial projection 18a on the end plate 18.

A coil spring 70 surrounds the portions of the inertia elements 60 and 62 adjacent their opposing ends. An annular recess 63 is formed in the elements 60 and 62 for receiving the spring. As may be seen from FIG. 1, the coil spring 70 is closely spaced from the surrounding housing wall 20. A shallow annular recess 72 may be formed in the wall 20 for receiving the coil spring with the desired spacing, although it is not critical.

The ends of the coil spring 70 are interconnected to the inertia elements 60 and 62 so that rotation of one inertia element will rotate the other element through the spring. More specifically, one end 70a of the spring, as shown in FIG. 3a, engages a radial shoulder 62a formed on the inertia element 62. The shoulder 62a is created by forming the end wall 62b of the recess 63 in the inertia element 62 so that it conforms to the spirally sloping end surface of the spring 70. The other end of the spring 70 is similarly, though reversely, positioned with respect to the inertia element 60.

The load transfer nut 44 is formed with a plurality of axially and radially extending teeth or ribs 74 as may be seen in FIGS. 2 and 3 which define spaces between them. The inertia element 60 is similarly formed with inwardly extending ribs or teeth 76 which fit within the spaces between the teeth 64 on the load transfer nut; however, the spaces between the teeth 74 and the spaces between the teeth 76 are larger than the teeth positioned therein so that in the position shown in FIG. 2, one edge of each tooth 74 is engaged with one edge of each tooth 76 but the other edges of the teeth are spaced circumferentially a distance greater than the width of the teeth.

Referring to FIG. 3, the inertia element 62, being identical to the element 60 also has inwardly extending teeth 78 which engage the teeth 74. However, in this instance, it is the other edge of each tooth 74 which engages the edge of the teeth 78. This occurs because of the reversal of the elements 60 and 62. The location of the teeth 76 and 78 on the inertia elements is circumferentially oriented or related to the location of the radial shoulders on the inertia elements that are engaged by the ends of the coil spring 70 so that the load transfer nut teeth 74 are oriented with respect to the inertia element teeth as shown in FIGS. 2 and 3.

Operation

When an axial force is applied to the strut causing it to become shorter or longer, the axial force is applied to the shaft 40 by means of the nut 34. The high-lead threads of the nut and shaft will produce rotation of the shaft as the strut members 10 and 12 are axially moving relative to each other. The rotation of the shaft 40 of course, rotates the load transfer nut 44 which is attached thereto. Relative axial motion of the strut members in one direction will produce counterclockwise rotation, and the teeth 74 on the load transfer nut 44 will engage and drive the teeth 76 formed on the inertia element 60 as shown in FIG. 2. However, referring to FIG. 3, it can be seen that the load transfer not does not drive the inertia element 62 with a counterclockwise rotation because the teeth 74 would tend to move away from the teeth 78.

Rotation of the inertia element 60 in a counterclockwise direction also rotates the coil spring 70 since the end of the spring engages the shoulder on the inertia element to cause such rotation. Rotation of the coil spring 70 in turn drives the inertia element 62 through the end 70a of the spring 70 engaging the shoulder 62a as shown in FIG. 3a. So long as the acceleration of the telescoping movement of the strut and the resulting rotation of the shaft and load transfer nut is slow, the inertia element 62 simply follows the movement of the inertia element 60 and the relationship of the components remains as illustrated in the drawings. Thus, the strut can accommodate slow movement such as that produced by the thermal expansion and contraction of the components and structures to which the strut is attached.

However, if the relative movement received by the strut approaches a predetermined acceleration threshold, the inertia of the inertia element 62 which is being rotated through the coil spring 70 will cause the element to lag rotationally because of the resiliency of the spring. This lagging rotation can be further understood by referring to FIG. 3 and visualizing the teeth 74 moving in a counterclockwise direction away from the teeth 78. The lagging movement of the inertia element 62 introduces a force or load which trys to compress the spring 70 along its spiral axis which causes the diameter of the coils to expand and frictionally engage the inner surface of the housing wall 20. This frictional engagement produces a braking action which limits the acceleration of the inertia elements, which in turn brakes or restricts the rotation of the load transfer nut and the shaft 40. Referring to FIG. 3, the width of the slots between the teeth is such that the lagging movement of the inertia element 62 can be accommodated without the teeth 78 interfering with the teeth 74.

When the accelerating force attempting to cause movement beyond the acceleration threshold is snubbed, the coil spring can relax and return the inertia element 62 to its normal position in relation to the load transfer nut 74 as shown in FIG. 3. The telescoping movement of the strut does not stop with this braking action produced by the coil spring and the inertia elements. Instead, the motion continues but at an acceleration rate which is below the predetermined threshold.

If the telescoping force on the strut is such as to produce rotation of the shaft 40 in the opposite or clockwise direction, the operation of the strut is the same with the exception that the inertia element 62 becomes the element positively or directly driven by the load transfer nut and the inertia element 60 is driven through the coil spring. More specifically, the teeth 74 on the load transfer nut positively drive the teeth 78 on the inertia element 62 as shown in FIG. 3. This force is then in turn transferred to the coil spring 70 by virtue of the shoulder 62a on the inertia element shown on FIG. 3a engaging the end of the coil spring 70. The spring then drives the element 60. Thus, it can be seen that the load transfer nut positively drives either of the inertia elements depending upon the direction of rotation but it only positively or directly drives one of them at a time, and the element not directly driven by the load transfer nut is instead rotated by means of the coil spring.

Embodiment of FIGS. 5-9

The embodiment of FIGS. 5-9 is similar to that of the embodiment of FIGS. 1-4 in that it employs a pair of inertia elements selectively driven by a rotating shaft and interconnected by a coil spring. However, the structure is otherwise greatly modified and simplified to form a very compact and axially short strut 79 having a minimum number of parts. There is shown a tubular or cylindrical housing 80 clamped between a pair of end plates 82 and 83 by a plurality of bolts 84 extending through the corners of the plates.

Attached to and extending outwardly from the end of each plate is a pair of guide pins 86. A pair of identical support or attachment members 88 are slidably mounted on the guide pins 86 for axial movement while being prevented from rotation. The members 88 are each provided with a pair of bores 89 for receiving the guide pins 86. The members 88 are further provided with an opening 90 through which connection is made to the structure whose motion is being snubbed or arrested. Each of the members 88 is further provided with a tubular extension 92 which extends into the end plates 82 and 83. The tubular extensions are internally threaded to mate with the threads on the end of a shaft 94 which extends through the housing coaxial with the cylindrical wall 80. The threads on the tubular extensions 92 and on the ends of the shaft 94 are of the high-lead type so that axial movement of the members 88 will produce rotation of the shaft. Note from FIG. 5 that the threads on one end of the shaft are left-hand and the threads on the other end of the shaft are right-hand. With this arrangement, the end members 88 can have the identical internal thread and movement of the members 88 towards each other will produce rotation of the shaft 94 in one direction and movement of the members 88 away from each will rotate the shaft 94 in the opposite direction.

Positioned within the housing 80 are a pair of inertia elements 96 and 98 which have a generally tubular or ring shape surrounding the shaft 94. The inertia elements 96 and 98 are rotatably mounted, but this is accomplished without the use of any roller or ball bearings. The inertia elements 96 and 98 are identical in shape and are axially aligned. However, they are positioned with their similar faces in opposing relation. A washer or ring shaped spacer 100 extends between these opposing faces to give them a slight clearance and keep the inertia element 96 and 98 on the relative center of the shaft 94. The housing is also thereby centrally positioned between the members 88. The other axial ends of the inertia elements are formed with axially extending tubular portions 102 which fit within sockets 104 formed in the end plates 82 and 83. The tubular portions 102 and the sockets 104 provide bearing surfaces for the inertia elements which rotationally and axially position the elements.

A spirally shaped coil spring 106 is positioned within annular recesses formed on the exterior of the inertia elements adjacent the opposing faces. The ends of the coil spring engage shoulders, (not shown) on the inertia elements in a manner similar to that explained in connection with the embodiment of FIGS. 1-4. The outer periphery of the coil spring 106 is closely spaced from the inner surface of the cylindrical wall 80.

Figure 8:
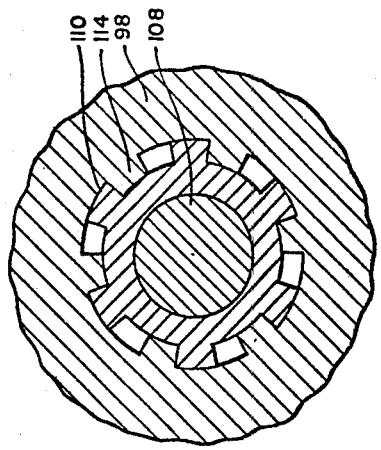
FIG. 8 is a cross-sectional view of the strut of FIG. 5 on line 8—8.

A load transfer nut 108 is fixed to the central section of the shaft 94 to rotate with the shaft. As with the arrangement of FIGS. 1-4, the load transfer nut 108 is provided with a plurality of radially extending teeth 110 which cooperate with radially extending teeth formed on the inertia elements 96 and 98. More specifically, the teeth 110 of the load transfer nut are oriented to drivingly engage the teeth 112 of the inertia element 96 when the load transfer nut is rotated in a counterclockwise direction as viewed in FIG. 7. By contrast, the teeth 110 will drive the teeth 114 on the inertia element 98 when the load transfer nut 108 is rotated in the opposite or clockwise direction, as shown in FIG. 8.

Operation

Figure 7:
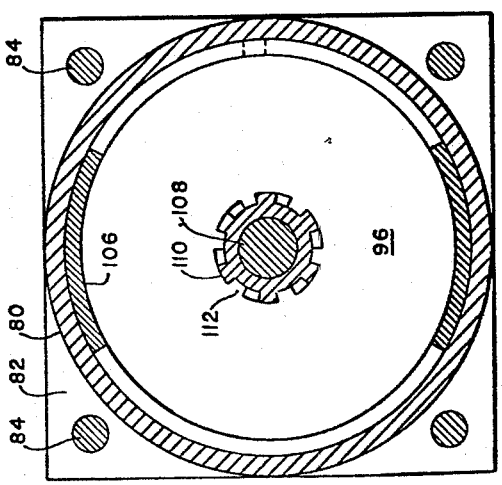
FIG. 7 is a cross-sectional view of the strut of FIG. 5 on line 7—7.

It will be apparent that movement of the end members 88 towards each other will permit the members 88 to slide towards the end plates on the guide pins 86. This movement will rotate the shaft 94 in one direction due to the threads on the shaft and the members 88. If the motion is in, say, a counterclockwise direction, the load transfer nut 108 will positively drive or rotate the inertia element 96 in a counterclockwise direction as shown in FIG. 7. Element 96 will in turn rotate element 98 by means of the coil spring 106. So long as the acceleration remains below a predetermined threshold, the inertia elements will simply rotate as the strut telescopes. However, if acceleration reaches the predetermined threshold, the inertia element 98 will lag by virtue of its resilient connection through the coil spring and will cause the coil spring diameter to expand and frictionally engage the cylindrical wall 80 producing a braking action on movement.

As with the embodiment of FIGS. 1-4, movement of the strut members in the opposite direction will produce the opposite rotation of the shaft 94. This in turn will cause the load transfer nut 108 to drive the other inertia element 98 by movement in the clockwise direction as shown in FIG. 8. The inertia element 96 then becomes the element driven through the coil spring 106 and the combination of the spring and the element 106 will sense the acceleration threshold to prevent acceleration beyond the threshold.

Figure 5:
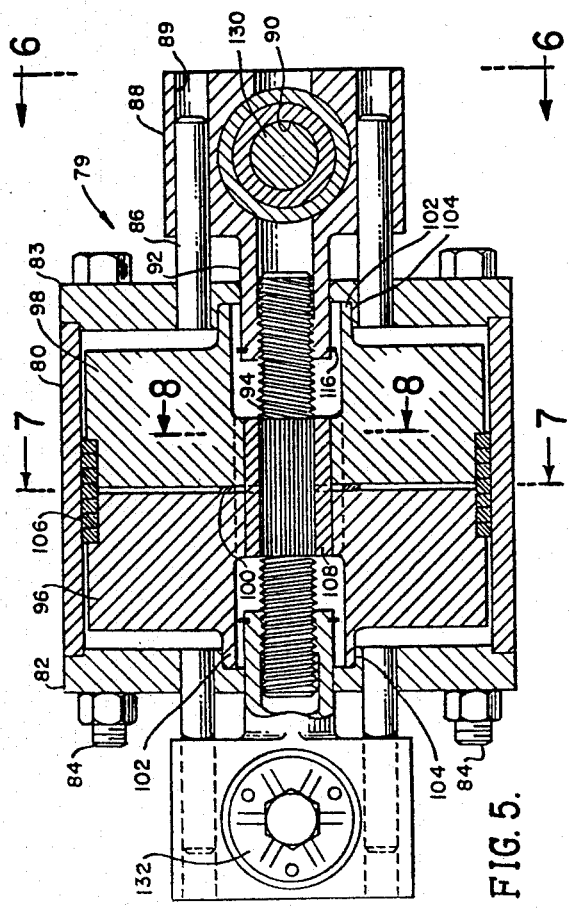
FIG. 5 is a cross-sectional view on the longitudinal axis of a strut embodying another form of the invention.

The device in FIG. 5 is particularly useful in situations wherein there is very limited axial space in which to position a snubber. An example of this is in connection with the fuel rod guide tubes within a power generating nuclear reactor. It has been determined that it is desirable from a safety standpoint to interconnect the fuel rod tubes with devices which will snub or arrest rapidly ocllitating forces such as that which might occur during an earthquake. The amount of relative movement which the device will be subjected to as a result of normal thermal changes is quite small, and thus the travel of the attachment members 88 with respect to the housing is limited, as determined by the guide pins 86 and retaining rings 116 positioned on the exterior of the tubular extension 92 on the attachment members 88.

Figure 9:
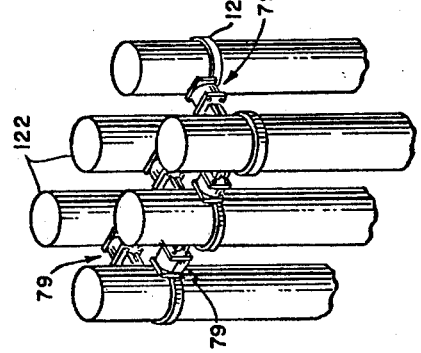
FIG. 9 is a schematic perspective view illustrating the strut of FIG. 5 in use.

The snubbing device of FIG. 5 is shown in FIG. 9 connected to such nuclear reactor fuel rod tubes. More specifically, there is shown a mounting bracket or structure 120 attached to a plurality of vertically oriented, closely spaced, parallel fuel rod tubes 122. The attachment bracket 120 has an outwardly extending lug 124 as best seen in FIG. 6, on which is mounted a stud 130. The snubbing device is positioned so that the stud 130 extends through the hole 90 in the connecting member 88. A suitable retaining element 132 fitting over the stud is shown on the other end of the device in FIG. 5. Thus, several snubbing devices 79 may be attached between a group of fuel rod tubes as shown in FIG. 9 to provide the necessary capability for preventing the fuel rods from whipping violently and dangerously during rapid movement such as that in an earthquake.

What is claimed is:

1. A motion snubbing device comprising:
    a pair of members mounted for relative movement;
    a pair of inertia elements mounted to be freely rotated;
    means connecting said members to said elements so that relative movement of said members in one direction will drive one of said inertia elements, and relative movement of said members in an opposite direction will drive the other inertia element; and
    means connecting said inertia elements in a manner such that rotating either of the elements below a predetermined motion threshold causes such element to rotate the other inertia element, and attempting to rotate said other inertia element above said threshold initiates braking action on said elements and said members which limits motion to said threshold.

2. The device of claim 1 including a housing surrounding said inertia elements; and
    wherein said elements are mounted in axial alignment, with an end of one element facing an end of the other element; and
    said element connecting means comprises a coil spring surrounding a portion of said elements adjacent said housing with the spring being arranged to transmit torque between the elements, the inertia of the spring driven element causing it to lag and increase the spring diameter so that it engages said housing to produce said braking action.

3. The device of claim 1 wherein said inertia elements are mounted on one of said members.

4. The device of claim 1 wherein said members are telescoping strut members and said means connecting said members to said elements includes means for translating the relative axial movement of said strut members into rotation of said inertia elements.

5. The device of claim 4 includes an axially fixed shaft rotatably mounted on one of said strut members and said inertia elements are axially fixed and are ring shaped and surround said shaft.

6. The device of claim 1 including a shaft rotatably mounted on one of said members and wherein said inertia elements are ring-shaped and surround said shaft, further including means fixed to said shaft and positioned within said inertia elements for selectively driving the other of said inertia elements including axially extending outwardly facing ribs which fit within axially extending slots on said inertia elements, said ribs drivingly engaging the edges of said slots on one of said inertia elements when said shaft is rotated in one direction and the edges of said slots on the other of said inertia elements being engaged by said ribs when the shaft is rotated in the opposite direction, said means connecting said inertia elements positioning said inertia elements so that said ribs are oriented so that only one inertia element at a time is directly driven by said torque transfer member.

7. The device of claim 1 wherein the means connecting said members to said elements includes a rotatably mounted shaft which is rotated in either direction by relative movement of said members;
    said inertia elements are annularly shaped and surround said shaft; and including
    means mounted on said shaft cooperating with means on the interior of said inertia elements for driving one of the inertia elements when the shaft is rotated in one direction and driving the other one of said elements when the shaft is rotated in the opposite direction.

8. The device of claim 7 wherein said inertia elements are identical in shape but are positioned in opposing relation surrounding said shaft; and
    wherein said means connecting said inertia elements angularly orients said elements so that only one of the elements is directly driven by the means on said shaft when the shaft is rotated in one direction and only the other inertia element is directly rotated when the shaft is rotated in the other direction.

9. The device of claim 1 wherein said members are a pair of strut members mounted for telescopic movement on each other;
    said means for connecting said members to said elements includes a shaft rotatably mounted on one of said strut members and means to convert axial movement of said strut members into rotation of said shaft, said inertia elements being rotatably mounted on said one strut member adjacent said shaft, and said means for connecting said members to said elements further includes means mounted on said shaft cooperating with said inertia elements for rotating the inertia elements; and said means interconnecting said inertia elements includes means for angularly orienting the inertia elements so that rotation of the shaft in one direction drives one element and rotation of the shaft in the opposite direction drives the other element.

10. The device of claim 1 wherein said means for interconnecting said members to said inertia elements includes a housing with a drive shaft mounted therein, the ends of said shaft being threaded and said members having threaded portions which mate with the threads on said shaft, the threads on said shaft and said threaded portions being arranged so that with one member threaded to one end of the shaft and the other member threaded to the other end of said shaft, relative movement of said members toward each other or away from each other produces rotation of said shaft, and means on said shaft for rotating said inertia members.

11. The device of claim 10 wherein said inertia members are annularly shaped and surround said shaft.

12. The device of claim 11 wherein said means interconnecting said inertia elements includes a coil spring surrounding the mating portions of said inertia elements, one end of the coil spring being connected to drive or be driven by one of the inertia elements while the other end of the spring is connected to drive or be driven by the other of said elements.

13. The device of claim 10 including guide means extending outwardly from opposite ends of said housing and slidably received in said members with one member on one end of the housing and the other member on the other end of the housing, said members being movable on the housing toward and away from each other, while being prevented from rotating.

14. A motion snubbing device comprising:
a pair of members mounted for relative movement with respect to each other;
acceleration sensitive means connected to said members for limiting movement of either of the members relative to the other member, in either of two opposite directions to a predetermined threshold acceleration rate, said acceleration sensitive means including a pair of rotatably mounted inertia members and means responsive to said relative movement in one direction for rotating one of said inertia elements and responsive to said relative movement in the opposite direction for rotating the other one of said elements, means interconnecting said inertia elements in a manner such that rotation of the element being driven by said relative movement will further rotate the other one of said elements so long as the rotational acceleration is below said threshold, and attempted acceleration above said threshold will cause the inertia element driven by the other inertia elements to lag because of its inertia, and means responsive to said lagging movement prevent acceleration beyond said threshold.

15. The device of claim 14 including a housing connected to one of said members, said inertia elements being annularly shaped and being rotatably mounted within said housing with the periphery of the inertia elements being closely spaced from the interior wall of the housing, said means interconnecting said inertia elements comprises a coil spring surrounding said inertia elements and being closely spaced from said housing, said coil spring being arranged with respect to said inertia members in a manner such that said lagging movement causes the coils of said spring to increase their diameter and engage the interior of said housing to provide said braking action which limits the acceleration.

16. A motion snubbing device comprising:
a pair of telescoping strut members, each of the strut members having means for attachment to structures whose relative movement is to be snubbed;
a cylindrical housing attached to one of said members and having a tubular portion extending outwardly therefrom toward the other member;
a shaft rotatably mounted in said housing with a portion of the shaft extending out of the housing through said tubular portion, said shaft portion having high-lead threads formed on its exterior, the other of said strut members having a tubular portion which is slidably received within the tubular portion on said one member and surrounds said shaft portion, threaded means formed on said last mentioned tubular portion for cooperating with the threads on said shaft so that axial movement of said strut members rotates said shaft;
a pair of inertia elements rotatably mounted in said housing, said inertia elements being ring-shaped and surrounding a portion of said shaft within said housing, said inertia element being similar in shape and being axially aligned in face to face opposed relation, each of said elements having an annular recess on its outer cylindrical surface adjacent the ends of the inertia elements which are in face to face relation; and
a coil spring positioned in said recess and surrounding said inertia elements, the spring being closely spaced from the surrounding housing, said coil spring being arranged such that rotation of one inertia element rotates the spring and transmits torque to the other inertia element, said spring being closely positioned to said housing so that when the acceleration of the inertia element driven by said spring exceeds a predetermined threshold, the inertia of the element will cause the element to lag and introduce and upwinding force on said spring causing it to expand and engage a surrounding surface on said housing, thus produce a braking action which limits the movement of said strut members to a predetermined threshold acceleration.

17. A mechanical shock arrestor comprising:
a housing having a cylindrical wall and a pair of end walls;
a pair of spaced guide-pins mounted in each of said end walls and extending axially, outwardly, parallel to the axis of said cylindrical wall;
a pair of members connected to said end plates for mounting the shock arrestor to structure whose shocks are to be arrested;
guide means on said mounting members and on said plates for slidably mounting the members axial movement with respect to said housing while preventing rotation of said members, each of said mounting members further including tubular portions which extend through said end plates and into said housing;
a drive shaft axially positioned within said cylindrical housing wall having threads formed on opposite ends of the shaft which threadably connected to said tubular portions, the thread connection being arranged so that when said members are moved toward each other, both members transmit torque to the shaft in the same direction and when said members are moved away from each other, torque is transmitted to the shaft in the opposite direction;

a pair of annularly shaped inertia members positioned within said housing surrounding said shaft, the inertia elements being mounted for free rotation while being axially fixed, said inertia elements being closely spaced from each other with the end face of one inertia element opposing the end face of the other element; and a coil spring surrounding the portion of said inertia elements adjacent the opposing ends faces of the elements, the ends of said springs being arranged to respectively engage a shoulder on each of said elements so that rotation of either element in one direction will drive the other element in the same direction through the means of said spring, the exterior of said coil spring being closely positioned adjacent the interior cylindrical surface of said housing; and means on the exterior of the central portion of said shaft and means on the inertia elements surrounding said shaft central portion for selectively engaging and driving only one of said elements when the shaft is rotated in one direction and selectively engaging and driving the other of said elements when the shaft is rotated in the opposite direction.

18. In a nuclear power generating plant, the combination comprising:

a plurality of fuel rod support tubes vertically oriented in closely spaced parallel relation; and an axially short mechanical shock arrestor connected to and extending between two of said tubes that are positioned adjacent to each other, said arrestor including an axially short housing having a tubular side wall and a pair of end plates, a pair of attachment members adapted to be connected to said pair of tubes, said members being respectively slidably mounted on one of said end plates to permit some horizontal movement of said members toward each other, a shaft positioned within said housing with one end of the shaft being threaded onto one attachment member and the other end of the shaft being threaded onto the other attachment member, the threads on said shaft and on said attachment members being arranged such that when a force urging said pair of tubes together is applied on said arrestor, the threaded connection between the attachment members and the shaft will rotate the shaft in one direction and when a force urging said pair of tubes apart is applied to the arrestor, the connecting members will rotate the shaft in the opposite direction, and means positioned in said housing and driven by said shaft for limiting the relative movement of the tubes to a predetermined threshold.

19. The combination of claim 18 wherein said limiting means includes an inertia element rotatably mounted in said housing and arranged to respond to the acceleration at said threshold to initiate a braking action to prevent acceleration beyond said threshold.

20. The combination of claim 18 wherein said limiting means includes a pair of axially short somewhat disc-shaped inertia members surrounding said shaft within said housing, the end of one inertia member being positioned in face to face relation with the end of the other inertia element, a coil spring surrounding said inertia elements adjacent the ends that are in face-to-face relation, the ends of the coil spring being arranged to transmit torque between said inertia elements, the exterior of said coil spring being closely spaced from the surrounding cylindrical wall of the housing so that when a force is applied to the spring, causing its coils to increase in diameter, the coils will brake against said wall.

21. The combination of claim 20 wherein the outer ends of said inertia elements are formed with a bearing surface which slidably engages the end plates of said housing to position the inertia elements both axially and rotatably.

22. The combination of claim 20 wherein each of said inertia elements is formed with an outwardly extending annular collar and said end plates are each formed with a socket on their inner wall for slidably receiving the collar on said inertia element.

23. An acceleration sensing motion snubbing mechanism comprising:

a pair of inertia elements mounted for free rotation;

means resiliently interconnecting said inertia elements in a manner such that rotation of either element will produce rotation in the other element although with a predetermined acceleration that rotation of the driven element will lag that of the driving element because of the resilient connection;

means for either driving one of said elements in one direction or driving the other of said elements in the opposite direction; and means responsive to the lagging movement of the element driven through said resilient connections for limiting the acceleration of said elements.

* * * * *